United States Patent
Kishi

(10) Patent No.: US 9,102,214 B2
(45) Date of Patent: Aug. 11, 2015

(54) VEHICULAR AIR-CONDITIONING SYSTEM

(75) Inventor: Noriaki Kishi, Chiryu (JP)

(73) Assignee: DENSO CORPORATION, Kariya (JP)

( * ) Notice: Subject to any disclaimer, the term of this patent is extended or adjusted under 35 U.S.C. 154(b) by 544 days.

(21) Appl. No.: 13/427,288

(22) Filed: Mar. 22, 2012

(65) Prior Publication Data

US 2012/0241126 A1 Sep. 27, 2012

(30) Foreign Application Priority Data

Mar. 25, 2011 (JP) ................................ 2011-068107

(51) Int. Cl.
*B60H 1/00* (2006.01)

(52) U.S. Cl.
CPC ............ *B60H 1/008* (2013.01); *B60H 1/00849* (2013.01)

(58) Field of Classification Search
CPC .............. B60H 1/00842; B60H 2001/00092; B60H 1/00007; B60H 1/00835; B60H 1/3205; B60H 3/0085; B60H 2001/2281
USPC ....................................................... 165/202
See application file for complete search history.

(56) References Cited

U.S. PATENT DOCUMENTS

| | | | | |
|---|---|---|---|---|
| 3,753,462 A | * | 8/1973 | Burger ........................... | 165/204 |
| 3,934,642 A | * | 1/1976 | Coulson et al. ................ | 165/203 |
| 4,112,338 A | * | 9/1978 | Kawasaki ...................... | 165/202 |
| 4,449,579 A | * | 5/1984 | Miyazaki et al. ......... | 165/104.33 |
| 4,738,396 A | * | 4/1988 | Doi et al. ....................... | 165/202 |
| 4,858,677 A | * | 8/1989 | Doi et al. ........................ | 165/202 |
| 4,938,033 A | * | 7/1990 | Ogihara et al. ................ | 165/202 |
| 5,299,631 A | * | 4/1994 | Dauvergne ...................... | 165/204 |
| 5,607,105 A | * | 3/1997 | Samukawa et al. ........... | 165/203 |
| 5,619,862 A | * | 4/1997 | Ruger et al. ................... | 165/202 |
| 5,642,856 A | * | 7/1997 | Samukawa et al. ........... | 165/203 |
| 5,765,635 A | * | 6/1998 | Rhee .............................. | 165/203 |
| 5,803,166 A | * | 9/1998 | Ito et al. ........................ | 165/203 |
| 6,003,593 A | * | 12/1999 | Halligan ........................ | 165/203 |
| 6,067,808 A | * | 5/2000 | Dage ............................. | 165/202 |
| 6,135,201 A | * | 10/2000 | Nonoyama et al. ........... | 165/202 |
| 6,138,749 A | * | 10/2000 | Kawai et al. .................. | 165/204 |
| 6,145,754 A | * | 11/2000 | Uemura et al. ................ | 165/203 |
| 6,192,698 B1 | * | 2/2001 | Kakehashi et al. ........... | 165/203 |
| 6,196,308 B1 | * | 3/2001 | Halligan ....................... | 165/203 |

(Continued)

FOREIGN PATENT DOCUMENTS

| | | |
|---|---|---|
| JP | 4-043118 | 2/1992 |
| JP | 9-240248 | 9/1997 |

(Continued)

OTHER PUBLICATIONS

Office action dated Dec. 11, 2012 in corresponding JP Application No. 2011-068107.

*Primary Examiner* — Ljiljana Ciric
(74) *Attorney, Agent, or Firm* — Harness, Dickey & Pierce, PLC

(57) ABSTRACT

A two-layer inside/outside air vehicular air-conditioning system which suppresses odor inside an air-conditioning case or inside a vehicular compartment is provided with an exhaust controller which uses an outside air intake port as an air exhaust port and which uses a compartment-side air discharge port opening/closing device to close all compartment-side air discharge ports. The exhaust controller also operates one or both of the blowers to cause air inside the first air passage and the second air passage to be exhausted via the air exhaust port.

5 Claims, 3 Drawing Sheets

(56) References Cited

U.S. PATENT DOCUMENTS

| | | | |
|---|---|---|---|
| 6,202,934 B1 * | 3/2001 | Kamiya et al. | 165/204 |
| 6,213,198 B1 * | 4/2001 | Shikata et al. | 165/202 |
| 6,253,841 B1 * | 7/2001 | Obara et al. | 165/204 |
| 6,330,909 B1 * | 12/2001 | Takahashi et al. | 165/202 |
| 6,352,102 B1 * | 3/2002 | Takechi et al. | 165/203 |
| 6,371,202 B1 * | 4/2002 | Takano et al. | 165/202 |
| 6,405,793 B1 * | 6/2002 | Ghodbane et al. | 165/203 |
| 6,422,309 B2 * | 7/2002 | Vincent | 165/204 |
| 6,644,558 B2 * | 11/2003 | Ohga et al. | 165/202 |
| 6,782,944 B2 * | 8/2004 | Kim et al. | 165/203 |
| 6,786,278 B2 * | 9/2004 | Ku | 165/204 |
| 6,793,016 B2 * | 9/2004 | Aoki et al. | 165/202 |
| 6,874,575 B2 * | 4/2005 | Kim | 165/204 |
| 6,945,060 B2 * | 9/2005 | Tomita et al. | 165/203 |
| 6,959,754 B2 * | 11/2005 | Lee et al. | 165/202 |
| 7,063,139 B2 * | 6/2006 | Horn et al. | 165/203 |
| 7,082,990 B1 * | 8/2006 | Uemura et al. | 165/203 |
| 7,222,665 B2 * | 5/2007 | Ichishi et al. | 165/202 |
| 7,380,586 B2 * | 6/2008 | Gawthrop | 165/202 |
| 7,413,007 B2 * | 8/2008 | Yamaoka | 165/202 |
| 7,997,331 B2 * | 8/2011 | Oomura et al. | 165/202 |
| 8,051,904 B1 * | 11/2011 | Whiting | 165/202 |
| 8,118,087 B2 * | 2/2012 | Saida et al. | 165/202 |
| 8,503,178 B2 * | 8/2013 | Chen et al. | 454/184 |
| 8,544,528 B2 * | 10/2013 | Seto et al. | 165/202 |
| 8,662,157 B2 * | 3/2014 | Kitamura et al. | 165/204 |
| 8,662,158 B2 * | 3/2014 | Seto et al. | 165/204 |
| 8,689,860 B2 * | 4/2014 | Seto et al. | 165/204 |
| 2004/0065101 A1 * | 4/2004 | Krupp et al. | 62/244 |

FOREIGN PATENT DOCUMENTS

| | | | |
|---|---|---|---|
| JP | 10-217752 | | 8/1998 |
| JP | 2000071741 A | * | 3/2000 |
| JP | 2004-175159 | | 6/2004 |
| JP | 2006-290032 | | 10/2006 |
| JP | 2007-131072 | | 5/2007 |
| JP | 2007131072 A | * | 5/2007 |
| JP | 2010-264826 | | 11/2010 |
| JP | 2010264826 A | * | 11/2010 |

* cited by examiner

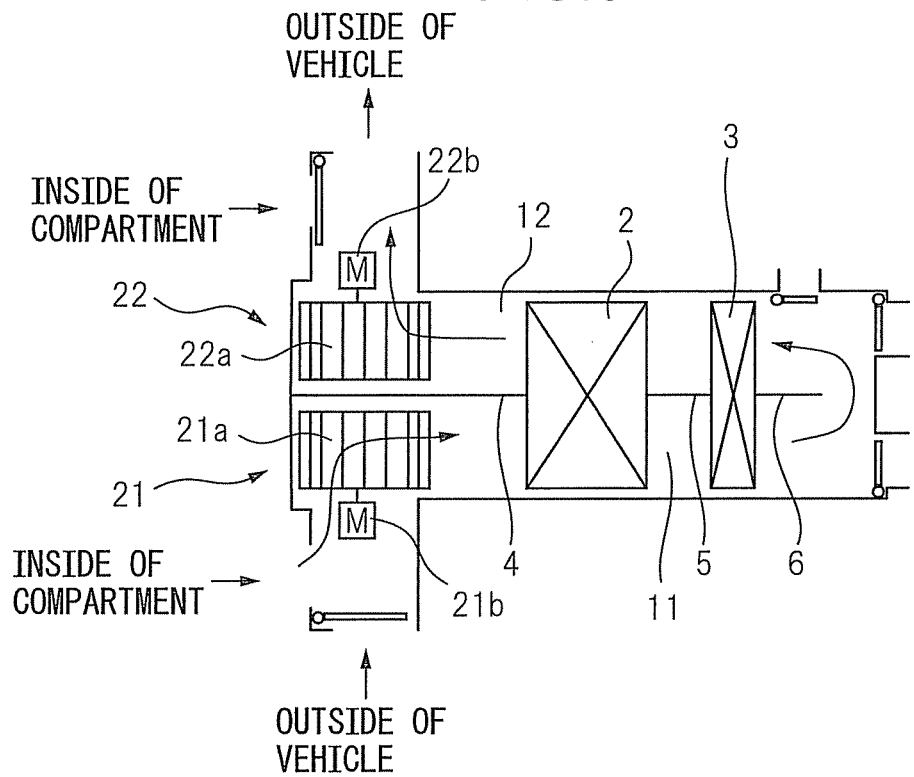
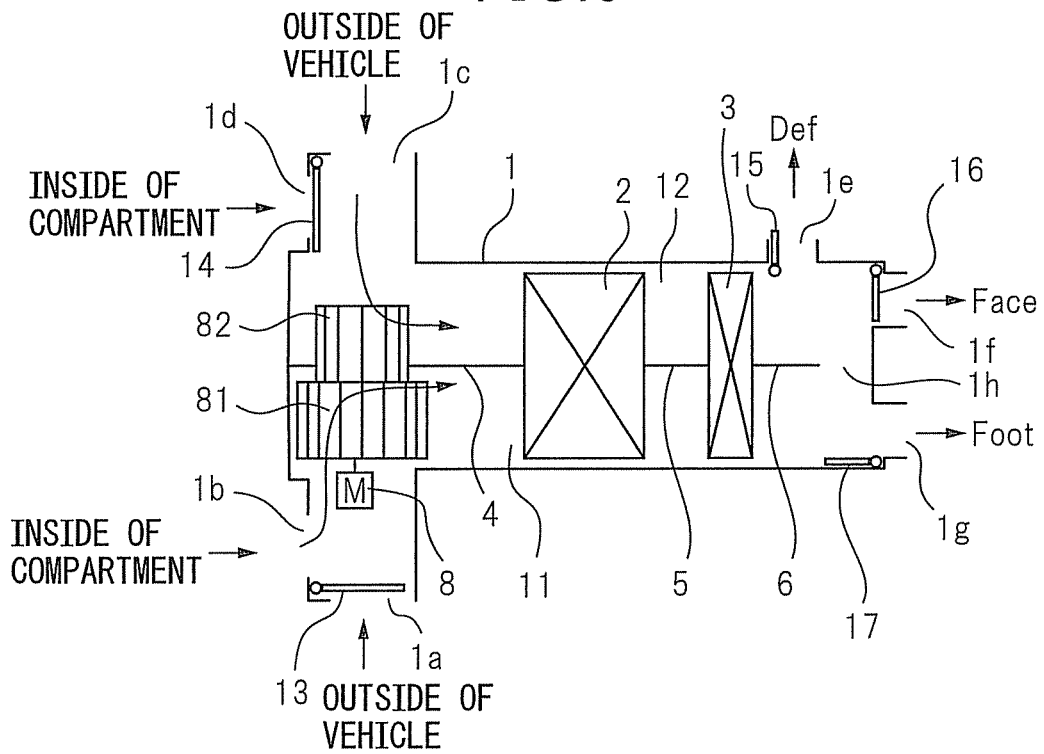

VEHICULAR AIR-CONDITIONING SYSTEM

BACKGROUND OF THE INVENTION

1. Field of the Invention

The present invention relates to a two-layer inside/outside air type vehicular air-conditioning system which is provided with partitioning members which partition the inside of an air-conditioning case which holds a cooling-use heat exchanger, a heating-use heat exchanger, and a vent temperature control means into a first air passage into which compartment air (below, called "inside air") is introduced and a second air passage into, which the atmosphere (below, called "outside air") is introduced, more particularly relates to an air-conditioning system which enables odors which are produced from the heat exchangers or odors inside of the compartment to be suppressed at the time of startup etc.

2. Description of the Related Art

A general vehicular air-conditioning system not of the two-layer inside/outside air type arranges an evaporator inside of an air-conditioning case and, at the time of cooling, supplies a refrigerant which was compressed by a compressor of a refrigeration cycle to the evaporator for cooling, uses a blower to suck air inside of the compartment or outside air inside the air-conditioning case, runs this through the evaporator, and blows cool air into the compartment. Further, at the time of heating, it runs this through a heater core which is provided inside the case and blows warm air into the compartment.

In this regard, in such a vehicular air-conditioning system, since inside air or outside air is introduced inside of the air-conditioning case during use, various kinds of dust or odor-carrying ingredients which are contained in the air will enter the case and stick to the evaporator. There was the problem that after a certain time elapsed, these gave off an unpleasant odor. The odor was released into the compartment together with the vented air.

In particular, when using an air-conditioning system to blow air after a certain period of non-use, a large amount of dust and odor-carrying ingredients would have deposited on the surface of the evaporator or heater core arranged inside the air-conditioning case during that period of non-use, and these ingredients etc. would have grown under a suitable temperature and humidity. For this reason, these odor-carrying ingredients cause an unpleasant odor to be released into the compartment along with the venting of air at the time of startup. Further, there was also the problem that bodily odors from people inside the car, the smell of food brought inside, etc. gave an unpleasant feeling to passengers in the car.

Therefore, in the past, Japanese Patent Publication (A) No. 2004-175159 etc. proposed a general vehicular air-conditioning system, not of the two-layer inside/outside air type, which arranged an exhaust passage at a downstream side of an evaporator and switched a passage door of the air-conditioning case at the time of startup etc. so as to discharge air inside of the case to the outside of the compartment. However, this had the demerits that a need arose to provide a new exhaust port at the vehicle, space became necessary for laying a duct, etc.

Next, a two-layer inside/outside air type of vehicular air-conditioning system (Japanese Patent Publication (A) No. 9-240248 and Japanese Patent Publication (A) No. 10-217752) will be simply explained. The "two-layer inside/outside air unit type of vehicular air-conditioning system" was devised for improving the heating ability in vehicles with little heat sources for heating use such as vehicles mounting diesel engines and electric vehicles and specifically is configured as shown in FIG. 6. That is, inside the air-conditioning case 1, partition plates 4 to 6 are used to form two air passages of a first air passage 11 from a first inside air introduction port 1b to compartment vents (defroster vents 1e, face vents 1f, foot vents 1g, etc.) and a second air passage 12 from a second outside air introduction port 1c to compartment vents 1e to 1g. Further, the two air passages 11 and 12 are provided with two blowers 81 and 82, an evaporator 2, and a heater core 3. These devices are used for blowing, cooling, and heating the air inside the two air passages 11 and 12. Note that, reference numerals 13 and 14 indicate inside/outside air switching doors which switch between the outside air introduction ports 1a and 1c and the inside air introduction ports 1b and 1d, while reference numerals 15 to 17 indicate doors which open and close the vents 1a to 1g. The blower 81 and the blower 82 are coaxially connected. The blowers are driven by a motor 8 in the same rotational direction by the same rotational speed.

Further, at the time of winter heating operation, a vent mode can be selected where low humidity outside air which is introduced from the outside air introduction port 1c is blown out through the second air passage 12 from the defroster vents 1e toward the front windshield and where inside air which is introduced from the inside air introduction port 1b is blown out through the inside air passage 11 from the foot vents 1g toward the passenger feet in the compartment. Further, if this vent mode is selected, since low humidity outside air is blown out to the front windshield, fogging of the front windshield is prevented, and already warmed inside air is introduced inside the first air passage 11. Therefore, the heating load of the heater core 3 is lightened and as a result the heating ability is improved.

In such a two-layer inside/outside air type of vehicular air-conditioning system, no literature can be found which describes measures taken against odors.

As other related art, there are the above-mentioned Japanese Patent Publication (A) No. 2004-175159, Japanese Patent Publication (A) No. 9-240248, and Japanese Patent Publication (A) No. 10-217752.

SUMMARY OF INVENTION

The present invention was made in consideration of the above problem and has as its object the provision of a two-layer inside/outside air type of vehicular air-conditioning system which takes measures against odors, in particular the provision of a two-layer inside/outside air type of vehicular air-conditioning system which does not require the provision of a new exhaust port or duct for taking measures against odors in the vehicle.

According to a first aspect of the present invention, there is provided a two-layer inside/outside air type vehicular air-conditioning system which is provided with:
(a) an air-conditioning case (1) which is formed at one end side with inside air intake ports (1b and 1d) and a plurality of outside air intake ports (1a and 1c) and which is formed at the other end side with compartment-side air discharge ports (1e, 1f, and 1g),
(b) partitioning members (4, 5, and 6) which partition the inside of this air-conditioning case (1) to a first air passage (11) which connects from the inside air intake port (1b) to the compartment-side air discharge ports (1e, 1f, and 1g) and a second air passage (12) which connects from the outside air intake port (1c) to the compartment-side air discharge ports (1e, 1f, and 1g),
(c) two blowing means (7a, 7b; 21a, 22a) which generate flows of air inside the air-conditioning case (1), (d) air-conditioning-use heat exchangers (2 and 3) which heat or cool the air which flows through the inside of the first air passage (11) and the air which flows through the inside of the second air passage (12), (e) inside/outside air switching means (13 and 14) which switch between a two-layer inside/outside mode which introduces compartment air from the inside air intake port (1b) to the first air passage (11) and introduces outside air from an outside air intake port (1c) to the second air passage (12) and an outside air introduction mode which introduces outside air from the outside air intake ports (1a and 1c) to the first air passage (11) and the second air passage (12), (f) compartment-side air discharge port opening/closing means (15, 16, 17) which open and close the compartment-side air discharge ports, and (g) an air exhaust controlling means which uses one of the outside air intake ports (1c) as an air exhaust port, uses the compartment-side air discharge port opening/closing means (15, 16, and 17) to substantially close all of the compartment-side air discharge ports (1e, 1f, and 1g), and operates one blowing means (7a or 21b) while not operating another blowing means (7a or 21b) so as to cause the air inside of the first air passage (11) and the second air passage (12) to be exhausted from the air exhaust port (1c).

The two-layer inside/outside air type vehicular air-conditioning system of the present invention suppresses odors inside the air-conditioning case or inside the compartment by using one of the outside air intake ports as an air exhaust port, using the compartment-side air discharge port opening/closing means to substantially close all of the compartment-side air discharge ports, and operating one blowing means and not operating the other blowing means so as to cause the air inside the first air passage and the second air passage to be exhausted from the air exhaust port. For this reason, there is no longer a need to provide a new exhaust port and duct in the vehicle for dealing with odors. For this reason, therefore, there is no longer a need for structural changes at the vehicle side and it becomes possible to keep down the increase in costs for dealing with odors.

According to a second aspect of the present invention, there is provided the two-layer inside/outside air type vehicular air-conditioning system wherein the air exhaust controlling means performs control to open an inside air intake port (1b) to cause air inside of the compartment and inside of the first air passage and the second air passage to be exhausted from the air exhaust port (1c). This clearly shows the specific configuration for suppressing odors in the air-conditioning case and in the compartment.

According to a third aspect of the present invention, there is provided the two-layer inside/outside air type vehicular air-conditioning system wherein the two blowing means (7a and 7b) are arranged coaxially and are connected to a single motor (8), and a connection switching means (9) is arranged between one the blowing means (7a) and the other the blowing means (7b) for switching between connection and disconnection of the two blowing means (7a and 7b). Due to this structure, it is possible to make the blowing means volumes substantially equal to blowing means of a conventional (non-odor-treating) two-layer inside/outside air type vehicular air-conditioning system, and it is possible to obtain a blowing rate equal to that of conventional blowing means.

According to a fourth aspect of the present invention, there is provided the two-layer inside/outside air type vehicular air-conditioning system wherein the two blowing means (21a and 22a) are respectively provided with motors (21b and 22b). This shows the configuration of other blowing means.

BRIEF DESCRIPTION OF THE DRAWINGS

These and other objects and features of the present invention will become clearer from the following description of the preferred embodiments given with reference to the attached drawings, wherein:

FIG. 5 is a schematic view in an odor-discharging state of a two-layer inside/outside air type vehicular air-conditioning system of a second embodiment of the present invention; and FIG. 6 is a schematic view in an inside/outside air introducing heating mode of a conventional two-layer inside/outside air type vehicular air-conditioning system.

DESCRIPTION OF THE PREFERRED EMBODIMENTS

Figure 1:
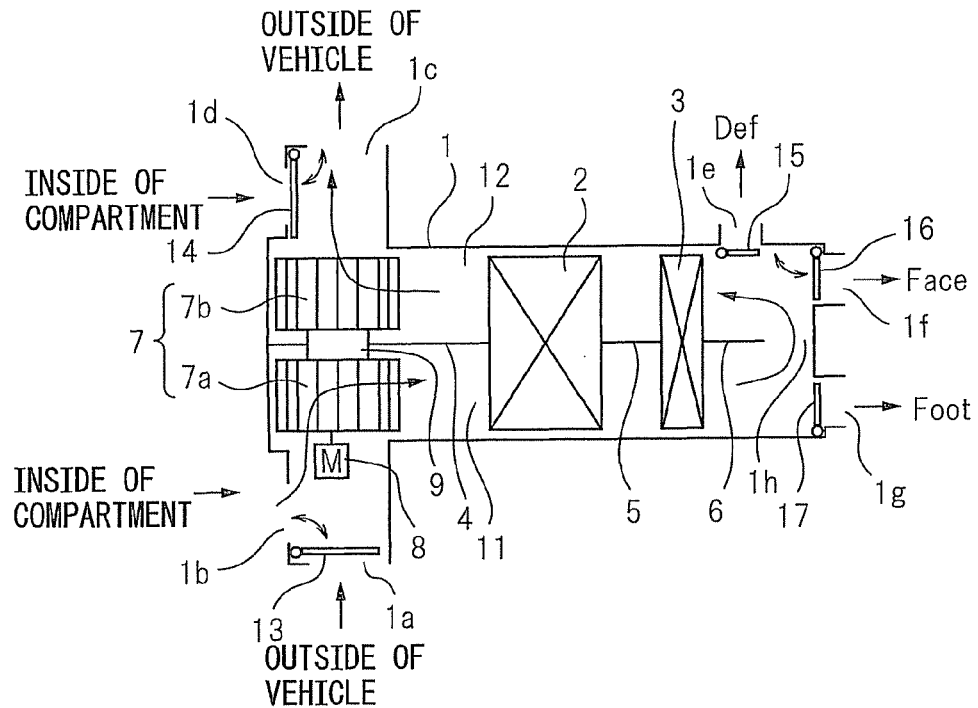
FIG. 1 is a schematic view in a vehicle odor suppression mode of a two-layer inside/outside air type vehicular air-conditioning system of a first embodiment of the present invention.

Below, embodiments of the present invention will be explained based on the drawings First Embodiment FIG. 1 is a view of the configuration which schematically shows an air-conditioning system of the first embodiment as a whole. With the exception of the blower, this is the same as the air-conditioning system which was explained in the section on the related art. Reference numeral 1 indicates an air-conditioning case which forms air passages. At one end side of this air-conditioning case 1, a first outside air introduction port 1a and a second outside air introduction port 1c which introduce outside air and a first inside air introduction port 1b and second inside air introduction port 1d which introduce inside air are formed. Further, inside this air-conditioning case 1, a first inside/outside air switching door 13 which selectively opens and closes the first outside air introduction port 1a and the first inside air introduction port 1b and a second inside/outside air switching door 14 which selectively opens and closes the second outside air introduction port 1c and the second inside air introduction port 1d are provided.

Further, the inside/outside air switching doors 13 and 14 are pivot type doors which swing about a shaft to open and close the outside air introduction port and inside air introduction port respectively. These doors 13 and 14 are driven by driving means (for example, servo motors). Further, inside of the air-conditioning case 1 at the downstream side of air from the introduction ports 1a to 1d, a blower 7 is provided for blowing air to a first air passage 11 and a second air passage 12. This blower 7 is comprised of a first fan 7a which blows air to the first air passage 11, a second fan 7b which blows air to the second air passage 12, and a single blower motor 8 which drives operation of the two fans. The first fan 7a mainly blows air toward a foot opening 1g, while the second fan 7b mainly blows air toward a defroster opening 1e or face opening 1f.

The first fan 7a and the second fan 7b are connected coaxially. An electromagnetic clutch 9 is interposed between the first fan 7a and the second fan 7b. When the electromagnetic clutch 9 is off, the fans are connected with each other and are driven by the motor M in the same rotational direction by the same rotational speed. On the other hand, when the electromagnetic clutch 9 is on, the fans are disconnected from each other and the second fan 7b is disconnected from the motor M, so the rotational force of the motor M is transmitted only to the first fan 7a and is not transmitted to the second fan 7b. For this reason, the first fan 7a operates by a predetermined speed, while the second fan 7b stops turning actively on its own. Note that, at this time, the second fan 7b sometimes turns passively due to the flow of air which passes through the second fan 7b.

Note that, a design is also possible of course where when the electromagnetic clutch 9 is on, the fans are connected with each other and are driven by the motor M in the same rotational direction by the same rotational speed, while when the electromagnetic clutch 9 is off, the fans are disconnected from each other and the second fan 7b is disconnected from the motor M. Further, instead of an electromagnetic clutch, it is also possible to use a pneumatic clutch or hydraulic clutch or other connection switching means. In short, a connecting switching means which switches between connection and disconnection of the two fans 7a and 7b may be provided.

Further, inside of the air-conditioning case 1 at the downstream side of air from the two fans 7a and 7b, an evaporator 2 is provided for cooling the air which flows through the inside of the two air passages 11 and 12. This evaporator 2 is provided inside of the air-conditioning case 1 so that all of the air inside the air-conditioning case 1 passes through this evaporator 2. This evaporator 2 is a heat exchanger which forms a known refrigeration cycle together with a compressor, condenser, pressure reducer, etc. (not shown).

Further, inside the air-conditioning case 1 at the downstream side of air from the evaporator 2, a heater core 3 is provided which heats the air which passed through the evaporator 2. This heater core 3 is provided inside the air-conditioning case 1 while forming a bypass passage by which the air inside the air-conditioning case 1 bypasses this heater core 3 (positioned at back side of sheet of paper showing heater core 3, so not shown in FIG. 1). Inside this, cooling water of the engines is circulated. This cooling water is used as a heat source to heat the air inside the air-conditioning case 1.

At the upstream side of air from this heater core 3, an air mix door (not shown) is arranged for adjusting the air mix between the amount of air which passes through the heater core 3 and the amount of air which passes through the bypass passage. Further, at the downstream-most end of the air-conditioning case 1, a defroster opening 1e, face opening 1f, and foot opening 1g are formed. Below, these openings will be referred to all together as the "compartment-side air discharge ports".

Further, the defroster opening 1e has a defroster duct (not shown) connected to it. The air-conditioned air which is introduced inside of this defroster duct is blown out from defroster vents at the downstream end of this defroster duct toward the inside surface of the vehicle front windshield. Further, the face opening 1f has a face duct (not shown) connected to it. The air-conditioned air which is introduced inside of this face duct is blown out from face vents at the downstream end of this face duct toward the upper torsos of the passengers inside of the compartment.

Further, the foot opening 1g has a not shown foot duct connected to it. The air-conditioned air which is introduced inside of this foot duct is blown out from foot vents at the downstream end of this foot duct toward the feet of the passengers inside the compartment. Further, the upstream side locations of the openings 1e to 1g are provided with a defroster door 15, face door 16, and foot door 17. The defroster door 15 is a door which opens and closes the air inflow path to the defroster duct, the face door 16 is a door which opens and closes the air inflow path to the center face duct, and the foot door 17 is a door which opens/closes the air inflow path to the foot duct. Note that, these doors 15 to 17 are driven by respective driving means (for example, servo motors).

Further, partition plates 4 to 6 are provided inside the air-conditioning case 1 which partition the space inside of the air-conditioning case 1 into the first air passage 11 which leads from the first inside air introduction port 1b or first outside air introduction port 1a to the compartment-side air discharge ports 1e to 1g and the second air passage 12 which leads from the second outside air introduction port 1c or second inside air introduction port 1d to the compartment-side air discharge ports 1e to 1g. Further, near the compartment-side air discharge port of the partition plate 6, a communicating opening 1h is formed which communicates the two air passages 11 and 12. The opening/closing of the communicating opening 1h may be controlled by an opening/closing door.

Further, the above-mentioned servo motors, blower motor 8, electromagnetic clutch 9, etc. are controlled by an air-conditioning control device (ECU; not shown). This air-conditioning control device receives as input signals from an inside temperature sensor, outside temperature sensor, and rest of a sensor group, signals from a temperature setting means for setting an inside temperature which is desired by the passengers, and signals from a vent mode setting means for manual selection of a vent mode of air to the inside of the compartment and an introduced air mode setting means for selecting the introduced air.

First, briefly, a typical mode of the normal air-conditioning operation of the air-conditioning operation according to the first embodiment (flow of air inside air-conditioning case 1) will be explained.

1. Inside/Outside Air Introducing Cooling Operation Mode (FIG. 3)

Figure 3:
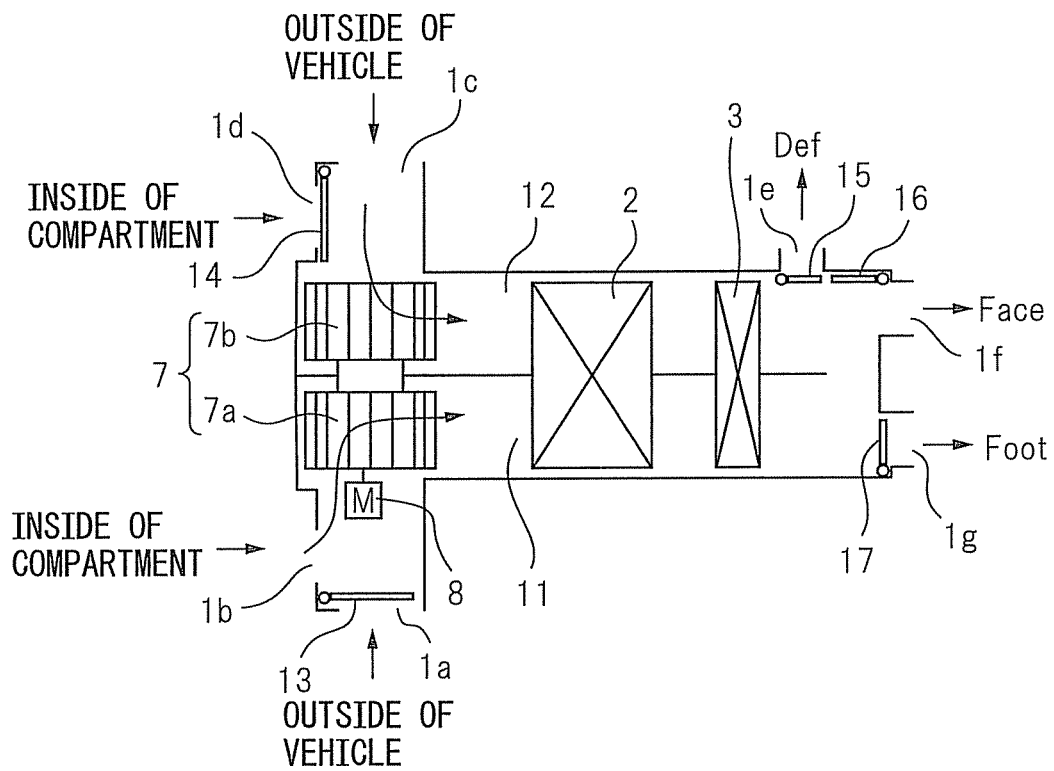
FIG. 3 is a schematic view in an inside/outside air introducing cooling operation mode of a two-layer inside/outside air type vehicular air-conditioning system of a first embodiment of the present invention.

If the cooling operation is performed in the state where the mode for introduction of both inside air and outside air has been selected, as shown in FIG. 3, the first inside/outside air switching door 13 is used to close the first outside air introduction port 1a and open the first inside air introduction port 1b, while the second inside/outside air switching door 14 is used to open the second outside air introduction port 1c and close the second inside air introduction port 1d. Due to this, the first inside air introduction port 1b and the second outside air introduction port 1c become open in state. Due to this, air is introduced from both the inlets of the first inside air introduction port 1b and second outside air introduction port 1c.

Further, to blow cool air in a concentrated manner toward the upper torsos of the passengers inside the compartment, the face opening 1f is opened by the door 16, while the defroster opening 1e and foot opening 1g are closed by the doors 15 and 17.

After this, the flows of air through the insides of the two air passages 11 and 12 are cooled by the evaporator 2 and are merged and mixed near the face opening 1f, with the result blown out from the face opening 1f toward the inside of the compartment. Note that, at the time of cooling operation, usually, as explained above, only the face opening 1f is open in state, so in the present embodiment, the explanation was given with reference to the example of the face opening 1f being open, but this mode can also be applied even in a state where only other openings (foot opening 1g, defroster opening 1e, etc.) are open.

2. Outside Air Introducing Operational Mode (FIG. 4)

Figure 4:
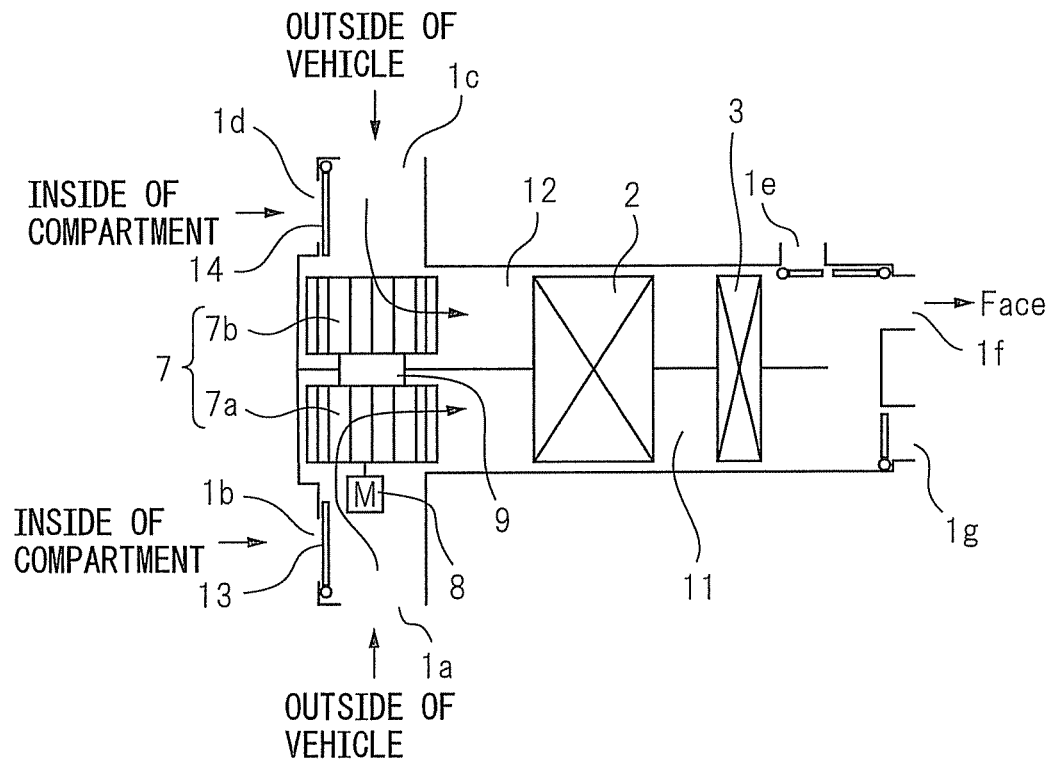
FIG. 4 is a schematic view in an outside air introducing operation mode of a two-layer inside/outside air type vehicular air-conditioning system of a first embodiment of the present invention.

If the outside air introduction mode is selected, as shown in FIG. 4, regardless as to if it is the time of a cooling operation or the time of a heating operation, the first inside/outside air switching door 13 is used to completely close the first inside air introduction port 1b and the second inside/outside air switching door 14 is used to completely close the second inside air introduction port 1d. Due to this, the first outside air introduction port 1a and the second outside air introduction port 1c become open in state. The electromagnetic clutch 9 of the blower 7 is off, so the first fan 7a and the second fan 7b are connected and operate in the same rotational direction by the same rotational speed. Therefore, the outside air is blown by the blower 7 (first fan 7a and second fan 7b) through the two air passages 11 and 12 toward the compartment-side air discharge ports 1e to 1g.

3. Inside Air Introducing Operational Mode (Not Shown)

If the inside air introduction mode is selected, regardless as to if it is the time of a cooling operation or the time of a heating operation, the first inside/outside air switching door 13 is used to open the first inside air introduction port 1b and to close the first outside air introduction port 1a. Furthermore, the second inside/outside air switching door 14 is used to open the second inside air introduction port 1d and to close the second outside air introduction port 1c.

Due to this, the inside air which is introduced from the first inside air introduction port 1b runs through the first air passage 11 and is blown out toward the compartment-side air discharge ports 1e to 1g, while the inside air which is introduced from the second inside air introduction port 1d runs through the second air passage 12 and is blown out toward the compartment-side air discharge ports 1e to 1g.

4. Inside/Outside Air Introducing Heating Operation Mode (FIG. 6)

The operation of this mode is the same as the operation explained in the section on the related art using FIG. 6.

In addition to the operational modes which were described above, various other operational modes are conceivable, but details will be omitted.

Next, an air-conditioning operation for suppressing odor of the air-conditioning system according to the first embodiment (flow of air inside the air-conditioning case 1) will be explained.

5. Mode for Suppressing Odor Inside Air-Conditioning Case and Inside Compartment (Compartment Odor Suppression Mode; FIG. 1)

As shown in FIG. 1, if the "mode for suppressing odor inside air-conditioning case and inside compartment" is selected either automatically or manually, the air-conditioning controlling means turns the electromagnetic clutch 9 on. When the electromagnetic clutch 9 is on, the second fan 7b is disconnected from the motor M, so the rotational force of the motor M is transmitted to only the first fan 7a and is not transmitted to the second fan 7b, whereby the first fan 7a turns by a predetermined speed, but the second fan 7b stops turning actively on its own.

Further, the first inside/outside air switching door 13 is used to open the first inside air introduction port 1b and to close the first outside air introduction port 1a. Furthermore, the second inside/outside air switching door 14 is used to close the second inside air introduction port 1d and to open the second outside air introduction port 1c. The defroster opening 1e, face opening 1f, and foot opening 1g are substantially all closed by the opening/closing doors 15 to 17.

In this state, the air-conditioning controlling means turns on the motor 8 and starts operation of the first fan 7a. This being so, the air inside the compartment flows in from the first inside air introduction port 1b to the air-conditioning case 1, runs together with the air inside the air-conditioning case 1 through the first air passage 11, communicating opening 1h, and second air passage 12 to the "opening for exhaust of air to the outside" comprised of the second outside air introduction port (air exhaust port) 1c, from which the air is exhausted to the outside.

Due to this air-conditioning operation, it becomes possible to discharge odor-carrying air at the inside of the car and air inside the air-conditioning case 1 to the outside. Note that, this odor suppression mode is preferably used at the time of startup, but is not limited to this. It may also be run manually when a passenger feels it necessary.

Figure 2:
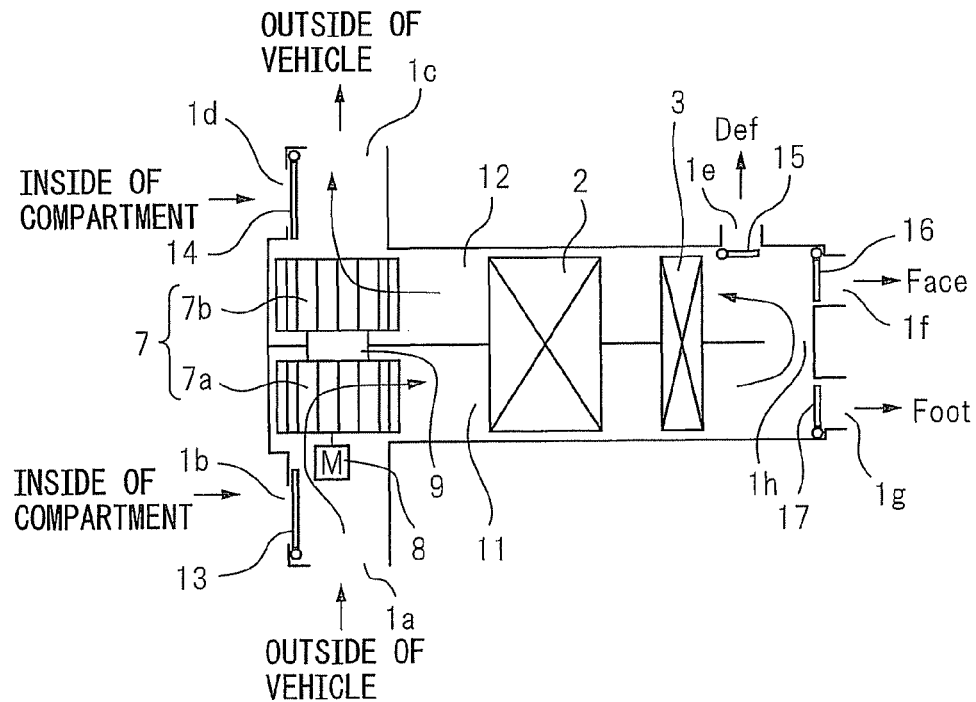
FIG. 2 is a schematic view in an air-conditioning case odor suppression mode of a two-layer inside/outside air type vehicular air-conditioning system of a first embodiment of the present invention.

6. Mode for Suppressing Odor in Only Air-Conditioning Case (Air-Conditioning Case Odor Suppression Mode; FIG. 2)

As shown in FIG. 2, if the "mode for suppressing odor in only air-conditioning case" is automatically or manually selected, the air-conditioning controlling means turns the electromagnetic clutch 9 on. When the electromagnetic clutch 9 is on, the second fan 7b is disconnected from the motor M, so the rotational force of the motor M is transmitted to only the first fan 7a and is not transmitted to the second fan 7b, whereby the first fan 7a turns by a predetermined speed, but the second fan 7b stops turning actively on its own.

Further, the first inside/outside air switching door 13 is used to close the first inside air introduction port 1b and to open the first outside air introduction port 1a. Furthermore, the second inside/outside air switching door 14 is used to close the second inside air introduction port 1d and to open the second outside air introduction port 1c. The defroster opening 1e, face opening 1f, and foot opening 1g are substantially all closed by the opening/closing doors 15 to 17.

In this state, the air-conditioning controlling means turns the motor 8 on to start the operation of the first fan 7a. This being so, the outside air flows in from the first outside air introduction port 1a to the inside of the air-conditioning case 1 and runs together with the air inside the air-conditioning case 1 through the first air passage 11, communicating opening 1h, and second air passage 12 to the second outside air introduction port 1c, which becomes the "opening for exhaust of air to the outside", where the air is exhausted to the outside.

Due to this air-conditioning operation, it becomes possible to exhaust the air carrying an odor from inside the air-conditioning case 1 to the outside.

Second Embodiment

FIG. 5 shows a second embodiment. In the second embodiment, there are two completely independent blowers. The first blower 21 is provided with a first fan 21a and a first blower motor 21b and is arranged at the inlet of the first air passage 11. The second blower 22 is provided with a second fan 22a and a second blower motor 22b and is arranged at the inlet of the second air passage 12. The rest of the configuration is the same as the first embodiment, so the explanation will be omitted.

Further, in each of the compartment odor suppression mode and the case odor suppression mode, the opened/closed states of introduction ports of the first inside/outside air switching door 13 and second inside/outside air switching door 14 are the same as in the first embodiment. Further, in each of the compartment odor suppression mode and the case odor suppression mode, the first blower motor 21b is turned on to make the first fan 21a operate and blow air while the second blower motor 22b is turned off to make the second fan 22a stop. Due to this air-conditioning operation, it becomes possible to exhaust the odor-carrying air inside the compartment and the air inside the air-conditioning case to the outside of the vehicle.

Others

The present invention performs an odor-suppressing air-conditioning operation when the air-conditioning is stopped and it is judged that discharge of odor is necessary or is desired by the passengers. The odor-suppressing air-conditioning operation is performed after the vehicle is stopped or when no passengers are present etc. Further, considering the fact that the inside of the air-conditioning case will collect odors, it is also possible to use a timer to perform intermittent operation or perform operation after the elapse of a certain time. It is also possible to use a remote key to detect when passengers will enter the vehicle and perform the odor-suppressing air-conditioning operation right before operating the air-conditioning system. It is also possible to perform the odor-suppressing operation for a certain time period when starting up the air-conditioning and then perform the normal air-conditioning control. Note that, in this specification, the "closed" of an opening or air vent includes the case where the opening or air vent is slightly open.

In this way, it becomes possible to provide a two-layer inside/outside air type of vehicular air-conditioning system which takes measures against odors, in particular a two-layer inside/outside air type of vehicular air-conditioning system which does not require the provision of a new exhaust port or duct for taking measures against odor in the vehicle.

While the invention has been described with reference to specific embodiments chosen for purpose of illustration, it should be apparent that numerous modifications could be made thereto by those skilled in the art without departing from the basic concept and scope of the invention.

The invention claimed is:

1. A two-layer inside/outside air vehicular air-conditioning system comprising:
   (a) an air-conditioning case formed at one end side with inside air intake ports and a plurality of outside air intake ports and formed at the other end side with compartment-side air discharge ports;
   (b) partitioning members which partition the inside of the air-conditioning case into each of a first air passage which connects said inside air intake port to the compartment-side air discharge ports and of a second air passage which connects said outside air intake port to the compartment-side air discharge ports;
   (c) two means for generating air flow of air inside said air-conditioning case, said two air flow generating means arranged coaxially and connected to a single motor;
   (d) air-conditioning-use heat exchangers which heat or cool the air which flows through the inside of said first air passage and the air which flows through the inside of said second air passage;
   (e) means for switching between a two-layer inside/outside mode which introduces compartment air from said inside air intake port to said first air passage and which introduces outside air from an outside air intake port to said second air passage and an outside air introduction mode which introduces outside air from said outside air intake ports to said first air passage and said second air passage;
   (f) means for opening and closing said compartment-side air discharge ports; and,
   (g) an air exhaust controller for using one of said outside air intake ports as an air exhaust port, for using said opening and closing means to substantially close all of said compartment-side air discharge ports, and for operating one of said air flow generating means while not operating the other of said air flow generating means so as to cause the air inside of said first air passage and said second air passage to be exhausted from said air exhaust port; wherein
   the switching means are arranged between one of said air flow generating means and the other of said air flow generating means for switching between connection and disconnection of said two air flow generating means.

2. The two-layer inside/outside air vehicular air-conditioning system as set forth in claim 1, wherein said air exhaust controller opens an inside air intake port to cause air inside of the compartment inside of said first air passage and inside said second air passage to be exhausted from said air exhaust port.

3. A two-layer inside/outside air vehicular air-conditioning system comprising:
   an air-conditioning case formed at one end side with inside air intake ports and a plurality of outside air intake ports and formed at the other end side with compartment-side air discharge ports;
   partitioning members which partition the inside of the air-conditioning case into each of a first air passage which connects said inside air intake port to the compartment-side air discharge ports and of a second air passage which connects from said outside air intake port to the compartment-side air discharge ports;
   a first fan generating air flow inside said first air passage,
   a second fan generating air flow inside said second passage, said second fan being coaxial with said first fan;
   air-conditioning-use heat exchangers which heat or cool the air which flows through the inside of said first air passage and the air which flows through the inside of said second air passage;
   means for switching between a two-layer inside/outside mode for introducing compartment air from said inside air intake port to said first air passage and for introducing outside air from an outside air intake port to said second air passage and an outside air introduction mode for introducing outside air from said outside air intake ports to said first air passage and said second air passage;
   means for opening and closing said compartment-side air discharge ports;
   means for rotating said first fan;
   means for rotating said second fan, the means for rotating said second fan including a switch disposed between said first and second fans; and
   a controller operating said means for rotating said first fan, said means for rotating said second fan, and said means for opening and closing said compartment-side air discharge ports; wherein
   air is exhausted from one of said outside air intake ports from said first and second air passages when said controller operates said means for rotating said first fan to generate air flow inside said first air passage, and the controller stops operation of said means for rotating said second fan to stop generating air flow inside said second passage and operates said opening and closing means to close all of said compartment-side air discharge ports such that said air flow inside said first air passage is directed through said second air passage and out of said one of said outside air intake ports.

4. The two-layer inside/outside air vehicular air-conditioning system according to claim 3, wherein:
   said means for rotating said first fan includes a first motor; and
   said means for rotating said second fan includes a second motor.

5. The two-layer inside/outside air vehicular air-conditioning system according to claim 3, wherein:
   said means for rotating said first fan includes a motor.

* * * * *